(12) United States Patent
Sherman et al.

(10) Patent No.: US 7,899,946 B2
(45) Date of Patent: Mar. 1, 2011

(54) AUDIO AND USB MULTIPLEXING

(75) Inventors: Itay Sherman, Hod Hasharon (IL); Eyal Miller, Givataim (IL)

(73) Assignee: Modu Ltd., Kfar Saba (IL)

( * ) Notice: Subject to any disclaimer, the term of this patent is extended or adjusted under 35 U.S.C. 154(b) by 97 days.

(21) Appl. No.: 12/008,582

(22) Filed: Jan. 11, 2008

(65) Prior Publication Data

US 2009/0182908 A1    Jul. 16, 2009

(51) Int. Cl.
G06F 3/00        (2006.01)
G06F 13/00       (2006.01)

(52) U.S. Cl. .................. 710/8; 710/11; 710/14; 710/15; 710/16; 710/18; 710/38; 710/51; 710/100; 710/104; 710/105; 710/300; 710/303; 710/304; 710/305; 710/306; 710/311; 710/313; 710/314; 710/315; 710/316

(58) Field of Classification Search .................. None
See application file for complete search history.

(56) References Cited

U.S. PATENT DOCUMENTS

| | | |
|---|---|---|
| 5,625,673 A | 4/1997 | Grewe et al. |
| 5,628,055 A | 5/1997 | Stein |
| 5,809,115 A | 9/1998 | Inkinen |
| 5,893,037 A | 4/1999 | Reele et al. |
| 5,907,815 A | 5/1999 | Grimm et al. |
| 6,188,917 B1 | 2/2001 | Laureanti |
| 6,201,867 B1 | 3/2001 | Koike |
| 6,243,578 B1 | 6/2001 | Koike |
| 6,477,357 B1 | 11/2002 | Cook |
| 6,516,202 B1 | 2/2003 | Hawkins et al. |
| 6,640,113 B1 | 10/2003 | Shin et al. |
| 6,690,947 B1 | 2/2004 | Tom |
| 6,898,283 B2 | 5/2005 | Wycherley et al. |
| 6,907,264 B1 | 6/2005 | Sterkel |
| 6,999,792 B2 | 2/2006 | Warren |

(Continued)

FOREIGN PATENT DOCUMENTS

EP         1871075 A1    12/2007

(Continued)

*Primary Examiner* — Tanh Q Nguyen
(74) *Attorney, Agent, or Firm* — Soquel Group LLC

(57) ABSTRACT

An analog/digital switching circuit for connecting a primary electronic device to a peripheral electronic device, including D+ and D− signal lines connected to a primary electronic device, a first analog/digital switch connected to the D+ signal line, for multiplexing an input D+ signal to an output USB data signal or audio left or right signal, the multiplexed signal feeding into a peripheral device connector for connecting the primary device to a peripheral electronic device, a second analog/digital switch connected to the D− signal line, for multiplexing an input D− signal to an output USB data signal or audio right or left signal, the multiplexed signal feeding into the peripheral device connector, a headset left signal line connected to the primary device and to the output audio left signal of the first analog/digital switch, a headset right signal line connected to the primary device and to the output audio right signal of the second analog/digital switch, a first USB signal line connected to a USB connector and to the output USB data signal of the first analog/digital switch, a second USB signal line connected to the USB connector and to the output USB data signal of the second analog/digital switch, and an amplifier that amplifies the output audio left signal and the output audio right signal at gain levels appropriate for (i) a headset connected to the primary device, (ii) a speaker connected to the peripheral device, and (iii) an earpiece connected to the peripheral device.

10 Claims, 7 Drawing Sheets

U.S. PATENT DOCUMENTS

| | | |
|---|---|---|
| 7,085,542 B2 | 8/2006 | Dietrich et al. |
| 7,103,381 B1 * | 9/2006 | Wright et al. .................. 455/557 |
| 7,188,196 B2 * | 3/2007 | Abullarade et al. ............. 710/22 |
| 7,194,285 B2 | 3/2007 | Tom |
| 7,266,391 B2 | 9/2007 | Warren |
| 2002/0090980 A1 | 7/2002 | Wilcox et al. |
| 2002/0151327 A1 | 10/2002 | Levitt |
| 2004/0153597 A1 * | 8/2004 | Kanai et al. .................... 710/305 |
| 2004/0233930 A1 | 11/2004 | Colby, Jr. |
| 2004/0268005 A1 | 12/2004 | Dickie |
| 2005/0021881 A1 * | 1/2005 | Asano et al. .................... 710/19 |
| 2005/0070225 A1 | 3/2005 | Lee |
| 2005/0159184 A1 | 7/2005 | Kerner et al. |
| 2005/0185364 A1 * | 8/2005 | Bell et al. ...................... 361/679 |
| 2006/0003804 A1 | 1/2006 | Liu |
| 2006/0105722 A1 | 5/2006 | Kumar |
| 2006/0222021 A1 * | 10/2006 | Ruff .............................. 370/522 |
| 2006/0241353 A1 | 10/2006 | Makino et al. |
| 2006/0262103 A1 * | 11/2006 | Hu et al. ........................ 345/173 |
| 2007/0004450 A1 * | 1/2007 | Parikh ........................ 455/556.1 |
| 2007/0014426 A1 * | 1/2007 | Sung et al. .................... 381/386 |
| 2007/0018957 A1 | 1/2007 | Seo |
| 2007/0079030 A1 | 4/2007 | Okuley et al. |
| 2007/0114974 A1 * | 5/2007 | Grady ........................... 320/137 |
| 2007/0161404 A1 | 7/2007 | Yasujima et al. |
| 2007/0239924 A1 * | 10/2007 | Foo et al. ...................... 710/316 |
| 2007/0288583 A1 | 12/2007 | Rensin et al. |
| 2008/0009325 A1 | 1/2008 | Zinn et al. |
| 2008/0026794 A1 | 1/2008 | Warren |
| 2008/0040354 A1 | 2/2008 | Ray et al. |
| 2008/0140886 A1 | 6/2008 | Izutsu |
| 2008/0140887 A1 * | 6/2008 | Gallant et al. ................. 710/100 |
| 2009/0079092 A1 * | 3/2009 | Liu et al. ....................... 257/777 |
| 2009/0113095 A1 * | 4/2009 | Liu et al. ....................... 710/104 |
| 2009/0124125 A1 * | 5/2009 | Chatterjee ................ 439/607.05 |

FOREIGN PATENT DOCUMENTS

| | | |
|---|---|---|
| WO | 9421058 A1 | 9/1994 |
| WO | 0059247 A1 | 10/2000 |
| WO | 0186922 A1 | 11/2001 |
| WO | 03103174 A1 | 12/2003 |

* cited by examiner

AUDIO AND USB MULTIPLEXING

FIELD OF THE INVENTION

The field of the present invention is analog/digital switches.

BACKGROUND OF THE INVENTION

When two electronic devices are connected, it is often of advantage to use the same electric signal line for different purposes. USB signal lines, for example, may be used to transfer audio signals.

Specifically, portable media players (PMPs) generally have USB interfaces, for connecting the PMPs to interoperable devices, such as USB cameras, USB card readers and USB hard drives. Due to size limitations, the same USB connector may be used for both USB data and audio output, and a multiplexor (MUX) is used to separate the USB signals from analog audio output.

In this regard, reference is made to FIG. 1, which is a prior art illustration of a general analog/digital switching device 100 that can also be used for routing USB 1.1 signals. Switching device 100 is a low voltage, CMOS device manufactured by Analog Devices of Norwood, Mass. As shown in FIG. 1, switching device 100 includes two independently selectable single-pole double-throw (SPDT) switches.

Switching devices such as the device shown in FIG. 1 are not flexible enough to support configurations where both of the connected USB devices have their own audio interfaces. In such case, multiple audio configurations may exist, and a more intelligent switching device is required to route the analog audio signals and the digital USB signals.

SUMMARY OF THE DESCRIPTION

Aspects of the present invention relate to a switching device that routes analog audio signals and digital USB signals for connected primary and peripheral electronic devices that have audio interfaces. The primary device has its own processor and operates both as a standalone device, and as a device attached to the peripheral device. The primary device may be, for example, a portable media player (PMP), and the peripheral device may be a jacket cover for the PMP including speakers and an earpiece, and a user interface with control buttons and input/output components. The peripheral device may alternatively be a host device, which also operates both as a standalone device, and as a device attached to the primary device.

The switching device of the present invention includes circuitry that detects multiple audio/USB configurations. Regarding audio configurations, the switching device supports left and right audio signals for a headset, for stereo speakers and for an earpiece. Regarding USB, the switching device supports connection of a PC or a USB charger to the primary device operating as a standalone device, and to the primary device attached to the peripheral device.

There is thus provided in accordance with an embodiment of the present invention an analog/digital switching circuit for connecting a primary electronic device to a peripheral electronic device, including D+ and D− signal lines connected to a primary electronic device, a first analog/digital switch connected to the D+ signal line, for multiplexing an input D+ signal to an output USB data signal or audio left or right signal, the multiplexed signal feeding into a peripheral device connector for connecting the primary device to a peripheral electronic device, a second analog/digital switch connected to the D− signal line, for multiplexing an input D− signal to an output USB data signal or audio right or left signal, the multiplexed signal feeding into the peripheral device connector, a headset left signal line connected to the primary device and to the output audio left signal of the first analog/digital switch, a headset right signal line connected to the primary device and to the output audio right signal of the second analog/digital switch, a first USB signal line connected to a USB connector and to the output USB data signal of the first analog/digital switch, a second USB signal line connected to the USB connector and to the output USB data signal of the second analog/digital switch, and an amplifier that amplifies the output audio left signal and the output audio right signal at gain levels appropriate for (i) a headset connected to the primary device, (ii) a speaker connected to the peripheral device, and (iii) an earpiece connected to the peripheral device.

There is further provided in accordance with an embodiment of the present invention an analog/digital switching circuit for connecting a primary electronic device to a peripheral electronic device, each device having audio and USB interfaces, wherein the primary device operates either as a standalone device or as a device in combination with the peripheral device, wherein the peripheral device operates only in combination with the primary device, and wherein the switching circuit automatically detects the following configurations: primary device operating standalone, being charged by a charger or by a PC via a USB interface, or not being charged, primary device operating standalone, playing audio into a headset, or not playing audio, primary device operating in combination with peripheral device, both devices being charged by a charger or by a PC via a USB interface, or not being charged, and primary device operating in combination with peripheral device, playing audio into a headset, or into an earpiece of the peripheral device or into speakers of the peripheral device, or not playing audio.

BRIEF DESCRIPTION OF THE DRAWINGS

The present invention will be more fully understood and appreciated from the following detailed description, taken in conjunction with the drawings in which.

DETAILED DESCRIPTION

Figure 1:
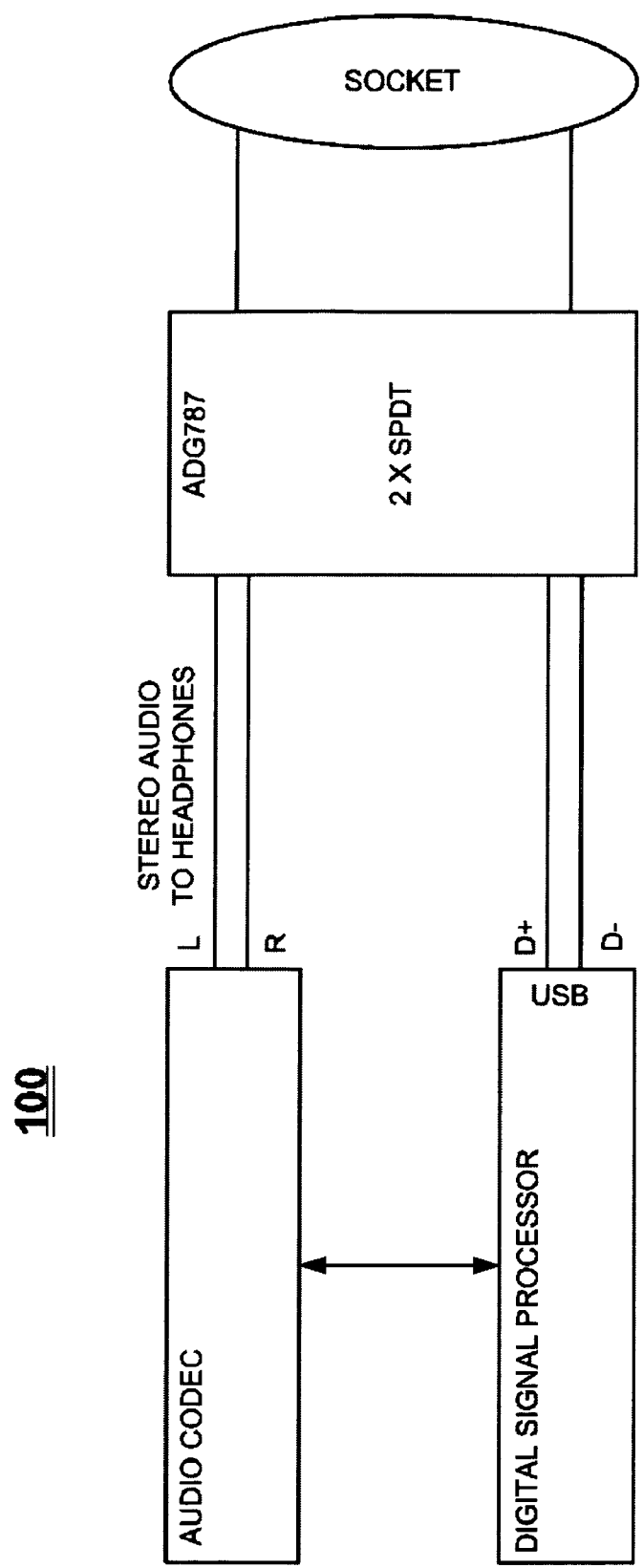
FIG. 1 is a prior art diagram of an analog/digital switch used for audio and USB multiplexing.
Figure 2:
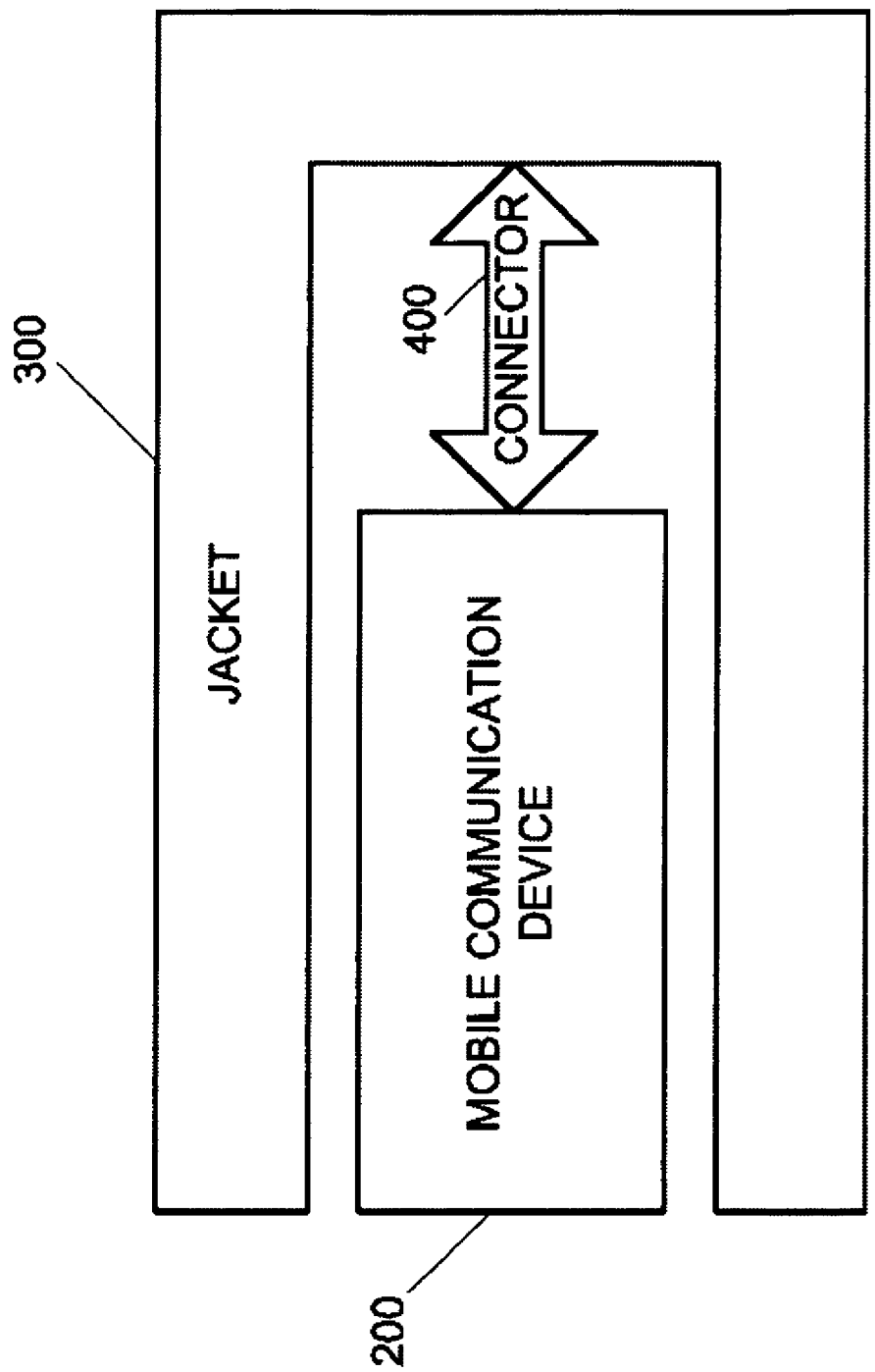
FIG. 2 is a simplified block diagram of a system including a mobile communication device, such as a cell phone, which functions as a standalone device, and which also connects to a peripheral device, in accordance with an embodiment of the present invention.
Figure 3:
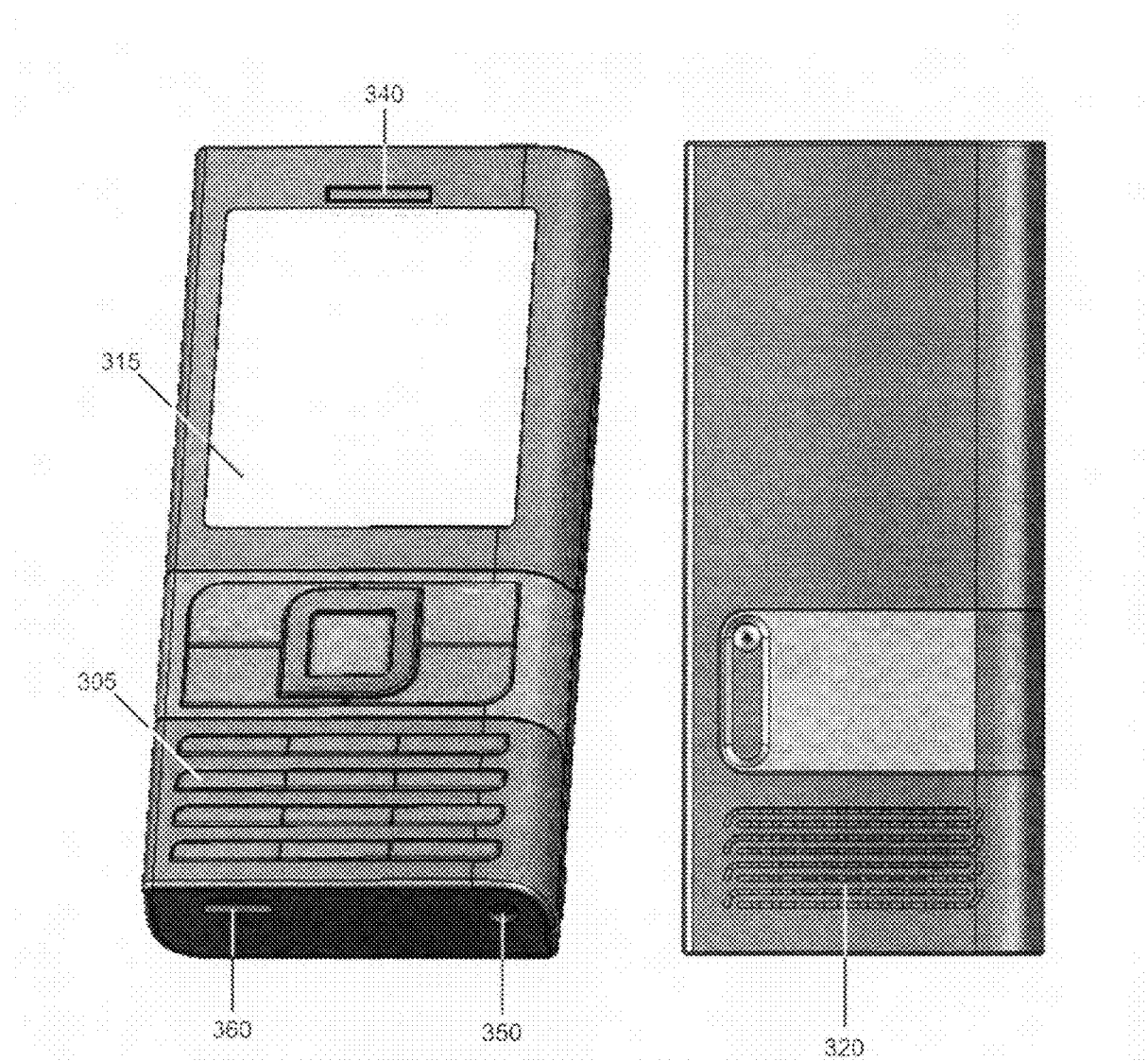
FIG. 3 is an illustration of front and back views of a sample jacket, in accordance with an embodiment of the present invention.

Reference is made to FIG. 2, which is a simplified block diagram of a system including a mobile communication device 200, such as a cell phone, which functions as a standalone device, and which also connects to a peripheral device 300, referred to as a "jacket", in accordance with an embodiment of the present invention. Front and back views of a sample jacket 300, in accordance with an embodiment of the present invention, are shown in FIG. 3.

Jacket 300 is generally only operative when connected to mobile communication device 200, and includes one or more of a keypad 305, a display 310, a microphone 315 (beneath keypad 305, shown in FIGS. 5 and 6B), a speaker 320, a speaker amplifier 330 (shown in FIGS. 5 and 6B), an earpiece 340, an earpiece amplifier 345 (shown in FIGS. 5 and 6B), a headset audio jack 350 and a USB connector 355. Mobile communication device 200 connects to jacket 300 via a dedicated connector 400 having a communication bus. It will be appreciated by those skilled in the art that jacket 300 illustrated in FIG. 3 has but one of many types of jacket designs that can be used with the present invention.

Mobile Communication Device 200

Figure 4:
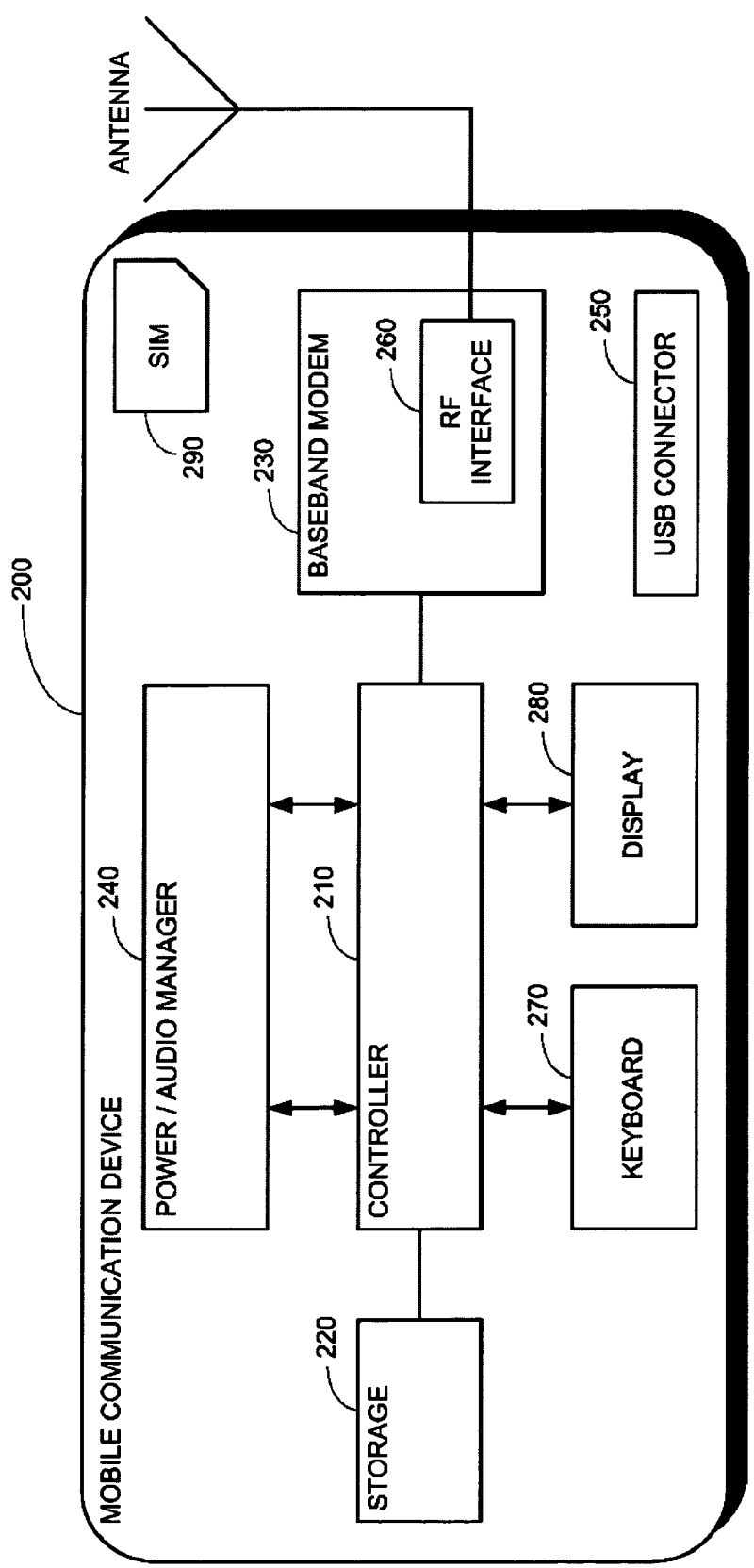
FIG. 4 is a simplified block diagram for the mobile communication device of FIG. 2, in accordance with an embodiment of the present invention.

Reference is now made to FIG. 4, which is a simplified block diagram for mobile communication device 200, in accordance with an embodiment of the present invention. As shown in FIG. 4, mobile communication device 200 includes five primary components, as follows: an ASIC controller 210, a memory storage 220, a baseband modem 230 for sending and receiving voice communications, a power/audio manager 240, and a USB connector 250.

ASIC controller 210 executes programmed instructions that control operation of mobile communication device 200. Baseband modem 230 includes a radio frequency (RF) interface 260 that is connected to an antenna.

Power/audio manager 240 includes a power/audio management integrated circuit (IC), such as the Triton T3029 chip manufactured by Texas Instruments Inc. of Dallas, Tex. Power/audio manager 240 provides inter alia power supply resources, a battery charger, and a voice and audio interface.

Mobile communication device 200 optionally includes a keyboard 270, a display 280 and a SIM card 290.

Mobile communication device 200 has a user interface to control whether a speaker or an earpiece is used for audio output.

Mobile communication device 200 includes circuitry for automatically detecting connection of a headset to a headset port of the mobile communication device, and connection of a charger or PC. Specifically, detection of connection of a headset is performed by sensing connection of a low resistance load on the headset left or right signals (respective elements HSOL and HSOR of FIG. 6A). Detection of connection of a charger or PC is performed by sensing a voltage on a Vbus pin (element Vbus of FIG. 6A).

Jacket 300

Figure 5:
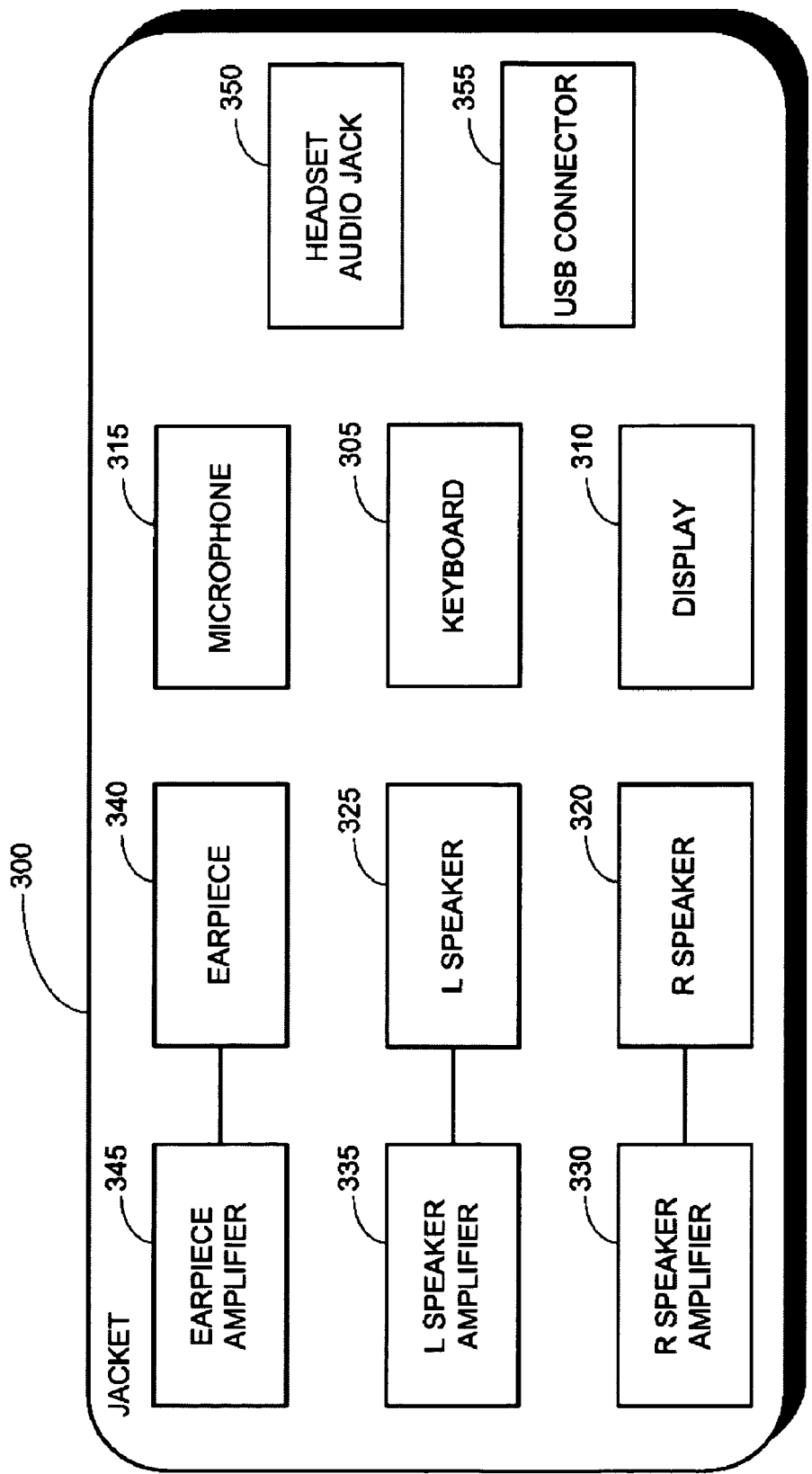
FIG. 5 is a simplified block diagram for the peripheral device of FIG. 2, in accordance with an embodiment of the present invention.

Reference is now made to FIG. 5, which is a simplified block diagram for jacket 300, in accordance with an embodiment of the present invention. As shown in FIG. 5, jacket 300 includes keyboard 305, display 310, microphone 315, respective left and right speakers and left and right speaker amplifiers 320, 325, 330 and 335, earpiece 340 and earpiece amplifier 345, headset audio jack 350 and USB connector 355.

Jacket 300 supports audio and USB signals being routed to headset audio jack 350, jacket earpiece 340, one or two jacket speakers 320 and 325, and jacket USB connector 355. Circuitry in jacket 300 supports stereo amplifiers 330 and 335 to drive respective stereo speakers 320 and 325, with high input impedance and low output impedance to drive 8Ω speakers. The circuitry in jacket 300 also supports earpiece amplifier 345, with a high impedance input and low impedance output to drive 32Ω speakers. The stereo and earpiece amplifiers use respective control signals, SPK_EN and EAR_EN (shown in FIG. 6B), to enable and disable their operation.

Jacket 300 provides a signal, Vbat_host, which enables mobile communication device 200 to detect that it is connected to jacket 300.

Connector 400

In accordance with an embodiment of the present invention, when mobile communication device 200 and jacket 300 are connected via the dedicated communication bus of connector 400, jacket 300 provides data regarding its audio configuration to mobile communication device 200, the information including inter alia the presence of mono or stereo speakers, and their gains, and the presence of earpiece and microphone, and their gains. Mobile communication device 200 provides signals to jacket 300 via dedicated connector 400, the signals including inter alia headset L/R, D+/−, audio L/R and microphone (elements L, R, D+/L, D−/R and mic of FIG. 6A).

Considering mobile communication device 200 both as a standalone device, and as a device connected to jacket 300, twelve audio/USB configurations are identified, as summarized in TABLE I.

TABLE I

Audio/USB Configurations of Mobile Communication Device & Jacket

| | State | Audio | USB |
|---|---|---|---|
| Standalone Mobile Device | S1 | no audio; | no USB connection |
| | S2 | audio via mobile device's speakers/earpiece | no USB connection |
| | S3 | audio via headset attached to mobile device | no USB connection |
| | S4 | no audio | charging via mobile device's USB charger/PC |
| | S5 | audio via mobile device's speaker | charging via mobile device's USB charger/PC |
| Mobile Device Connected to Jacket | J1 | no audio | no USB connection |
| | J2 | audio via jacket's speaker | no USB connection |
| | J3 | audio via jacket's earpiece | no USB connection |
| | J4 | audio via headset attached to jacket | no USB connection |
| | J5 | no audio | charging mobile device and jacket via USB charger connected to jacket |
| | J6 | audio via jacket's speaker | charging mobile device and jacket via USB charger connected to jacket |
| | J7 | audio via headset attached to jacket | charging mobile device and jacket via USB charger connected to jacket |

Figure 6A:
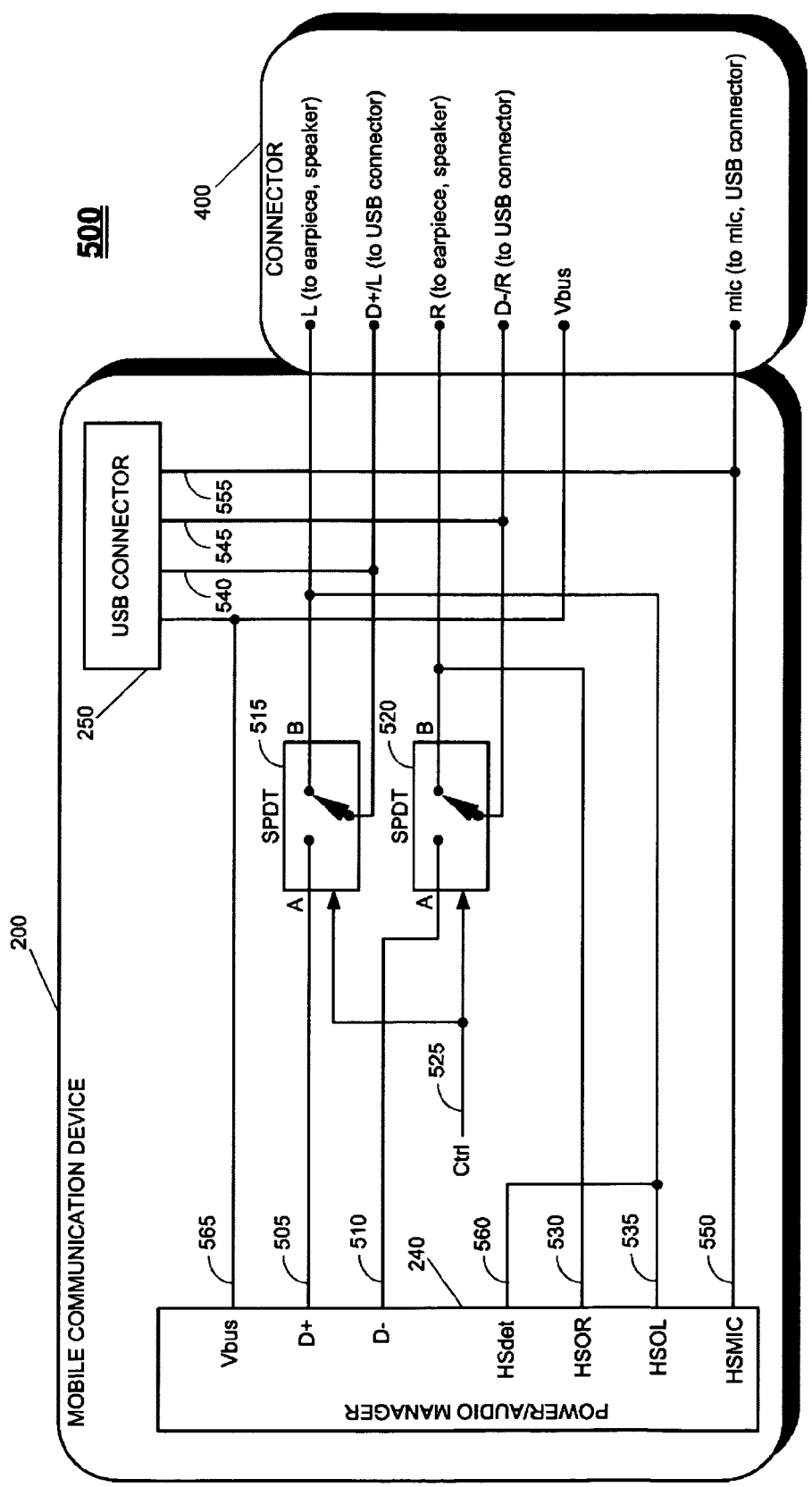
FIGS. 6A and 6B are simplified diagrams of a switching circuit that distinguishes between twelve audio/USB configurations of the mobile communication device and peripheral device of FIG. 2, in accordance with an embodiment of the present invention.
Figure 6B:
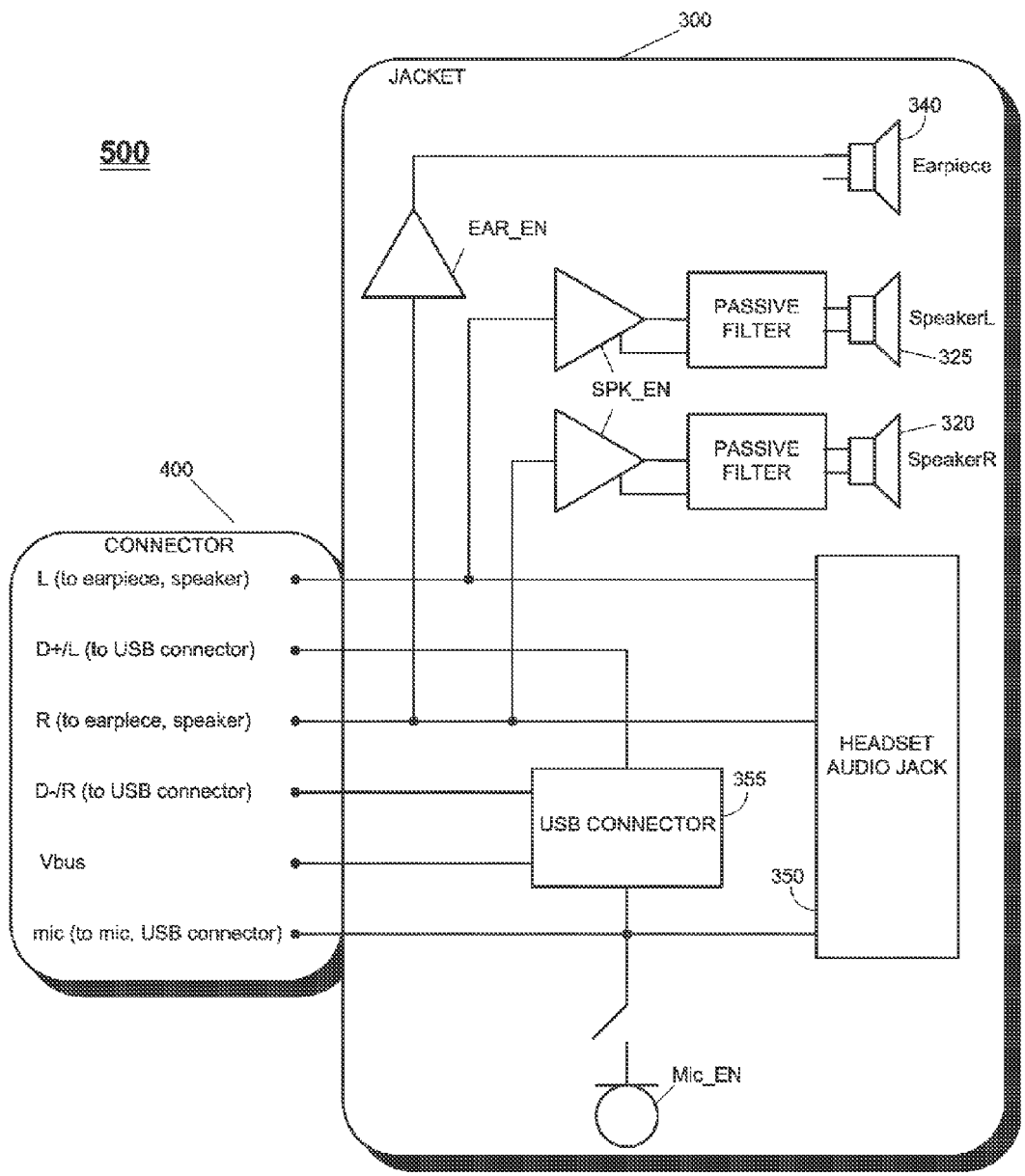

Reference is now made to FIGS. 6A and 6B, which are simplified diagrams of a switching circuit 500 that distinguishes between the twelve audio/USB configurations of TABLE I, in accordance with an embodiment of the present invention. Specifically, the detection methods and control settings for supporting the twelve audio/USB configurations of TABLE I are summarized in TABLE II.

TABLE II

Control Settings and Detection Methods for Audio/USB Configurations

| Mode | Mobile Speaker/ Earpiece Amplifier | Mobile Headset Amplifier | USB/Audio Switch | Jacket Speaker Amplifier (SPK_EN) | Jacket Earpiece Amplifier (EAR_EN) | Detection (Vbus/ Headset/ Jacket) |
|---|---|---|---|---|---|---|
| S1 | Disabled | Disabled | Audio | NA | NA | No/No/No |
| S2 | Enabled | Disabled | Audio | NA | NA | No/No/No |
| S3 | Disabled | Enabled (G1) | Audio | NA | NA | No/Yes/No |
| S4 | Disabled | Disabled | USB | NA | NA | Yes/x/No |
| S5 | Enabled | Disabled | USB | NA | NA | Yes/x/No |
| J1 | Disabled | Disabled | Audio | Disabled | Disabled | No/No/Yes |
| J2 | Disabled | Enabled (G2) | Audio | Enabled | Disabled | No/No/Yes |
| J3 | Disabled | Enabled (G3) | Audio | Disabled | Enabled | No/No/Yes |
| J4 | Disabled | Enabled (G1) | Audio | Disabled | Disabled | No/Yes/Yes |
| J5 | Disabled | Disabled | USB | Disabled | Disabled | Yes/x/Yes |
| J6 | Disabled | Enabled (G2) | USB | Enabled | Disabled | Yes/x/Yes |
| J7 | Disabled | Enabled (G3) | USB | Disabled | Enabled | Yes/x/Yes |

The values G1, G2 and G3 in TABLE II denote different gain levels. The headset amplifier is set to different gain levels, depending on the type of speakers it has to drive. Thus a different setting is generally required for headset connection, amplified jacket speakers and amplified jacket earpiece.

Circuit 500 includes the following elements shown in FIG. 6A:
  respective D+ and D− signal lines 505 and 510 connecting to power/audio manager 240 of mobile communication device 200;
  a first analog/digital switch 515 connected to D+ signal line 505, for multiplexing a D+/L USB signal to the D+ data signal or an audio left signal;
  a second analog/digital switch 520 connected to D− signal line 510, for multiplexing a D−/R USB signal to the D− data signal or an audio right signal;
  a control signal line 525 for controlling the switching between audio and USB signals at switches 515 and 520;
  a headset left signal line 535 connected to power/audio manager 240 and to the audio left signal of analog/digital switch 515;
  a headset right signal line 530 connected to power/audio manager 240 and to the audio right signal of analog/digital switch 520;
  a first USB signal line 540 connected to USB connector 250 and to the D+/L USB signal of analog/digital switch 515;
  a second USB signal line 545 connected to USB connector 250 and to the D−/R USB signal of analog/digital switch 520;
  a headset microphone signal line 550 connected to power/audio manager 240 and to connector 400;
  a signal line 555 connected to USB connector 250 and to headset microphone signal line 550;
  a headset detection line 560 for detecting connection of a headset to a headset port; and
  a USB detection line 565 connected to power/audio manager 240 and to USB connector 250, for detecting a USB charger or a PC attached to USB connector 250.

Circuit 500 also includes an amplifier (not shown) for amplifying the output audio left signal and the output audio right signal at gain levels appropriate for (i) a headset connected to mobile communication device 200, (ii) a speaker connected to jacket 300, and (iii) an earpiece connected to jacket 300.

Circuit 500 is designed so that the same detection mechanisms are used to detect direct connection of a charger to mobile communication device 200 or to jacket 300, and to detect amplified jacket speakers or amplified jacket earpiece. Generally, when mobile connection device 200 is connected to jacket 300, access to the mobile communication device's charger and the mobile communication device's audio connector is physically blocked, being covered by jacket 300.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. An analog/digital switching circuit for connecting a primary device to a peripheral device, the primary device comprising a primary USB connector, a power/audio manager and at least one primary listening device, and the peripheral device comprising a peripheral USB connector and at least one peripheral listening device comprising:
    first and second data signal lines connected to the power/audio manager, for transmitting respective first and second data signals;
    first and second audio signal lines for transmitting respective first and second audio signals generated by the power/audio manager to the at least one primary listening device or the at least one peripheral listening device;
    first and second primary USB signal lines connected to the primary USB connector, for transmitting respective first and second USB signals;
    first and second peripheral USB signal lines connected to the peripheral USB connector and to the respective first and second primary USB signal lines;
    a USB detection line connected to the power/audio manager, to the primary USB connector and to the peripheral USB connector, for detecting a USB charger attached to the primary USB connector or to the peripheral USB connector;
    a first switch for multiplexing the first USB signal to the first data signal or the first audio signal;
    a second switch for multiplexing the second USB signal to the second data signal or the second audio signal; and
    configuration detection circuitry for detecting, based on states of said first and second switches, each of the following configurations:

(c1) primary device not connected to peripheral device, audio not to be output to a primary listening device, USB charger not connected to primary device;
(c2) primary device not connected to peripheral device, audio is to be output to a primary listening device, USB charger not connected to primary device;
(c3) primary device not connected to peripheral device, audio not to be output to a primary listening device, USB charger is connected to primary device;
(c4) primary device not connected to peripheral device, audio is to be output to a primary listening device, USB charger is connected to primary device;
(c5) primary device is connected to peripheral device, audio not to be output to a peripheral listening device, USB charger not connected to peripheral device;
(c6) primary device is connected to peripheral device, audio is to be output to a peripheral listening device, USB charger not connected to peripheral device;
(c7) primary device is connected to peripheral device, audio not to be output to a peripheral listening device, USB charger is connected to peripheral device; and
(c8) primary device is connected to peripheral device, audio is to be output to a peripheral listening device, USB charger is connected to peripheral device.

2. The switching circuit of claim 1 further comprising:
a microphone signal line connected to the power/audio manager, for transmitting a microphone signal; and
a signal line connected to the primary USB connector and to said microphone signal line.

3. The switching circuit of claim 1 wherein the primary device comprises a jack for a headset, wherein the at least one primary listening device comprises the headset, wherein the peripheral device comprises a jack for the headset, and wherein the at least one peripheral listening device comprises the headset, the switching circuit further comprising:
a headset left signal line connected to the power/audio manager and to said first audio signal line;
a headset right signal line connected to the power/audio manager and to said second audio signal line; and
a headset detection line connected to the power/audio manager and to said headset left signal line or to said headset right signal line, for detecting attachment of the headset to the headset jack of the primary electronic device or to the headset jack of the peripheral electronic device.

4. The switching circuit of claim 1 wherein said first switch and said second switch are single-pole double-throw (SPDT) switches.

5. The switching circuit of claim 1 wherein said at least one peripheral listening device comprises 8Ω stereo speakers, and wherein said first audio signal line and said second audio signal line are connected to first and second amplifiers for the speakers.

6. The switching circuit of claim 1 wherein said at least one peripheral listening device comprises a 32Ω earpiece, and wherein said first audio signal line or said second audio signal line is connected to an amplifier for the earpiece.

7. The switching circuit of claim 1 wherein the primary device is a mobile phone.

8. The switching circuit of claim 7 wherein the at least one peripheral listening device comprises an earpiece and stereo speakers.

9. The switching circuit of claim 1 wherein the at least one peripheral listening device comprises an earpiece, stereo speakers and a headset, wherein said first audio signal line or said second audio signal line is connected to an amplifier for the earpiece, wherein said first audio signal line and said second audio signal line are connected a headset jack for the headset and also to respective amplifiers for the stereo speakers, and wherein said configuration detection circuitry also detects in configurations (c2), (C4), (c6) and (c8) whether the listening device for the audio output is the headset, the earpiece or the stereo speakers.

10. The switching circuit of claim 9 wherein said USB detection line detects a PC attached to the primary USB connector or to the peripheral USB connector, and wherein said configuration detection circuitry also detects whether or not the PC is attached to the primary USB connector or to the peripheral USB connector and, if so, to which USB connector the PC is attached.

* * * * *